United States Patent
Rehfuss

(10) Patent No.: US 8,943,211 B2
(45) Date of Patent: Jan. 27, 2015

(54) REPUTATION MASHUP

(75) Inventor: Paul S. Rehfuss, Portland, OR (US)

(73) Assignee: Microsoft Corporation, Redmond, WA (US)

( * ) Notice: Subject to any disclaimer, the term of this patent is extended or adjusted under 35 U.S.C. 154(b) by 865 days.

(21) Appl. No.: 12/497,073

(22) Filed: Jul. 2, 2009

(65) Prior Publication Data

US 2011/0004693 A1    Jan. 6, 2011

(51) Int. Cl.
*G06F 15/16* (2006.01)
*G06Q 99/00* (2006.01)
*G06Q 30/02* (2012.01)
*G06Q 50/00* (2012.01)

(52) U.S. Cl.
CPC ............... *G06Q 30/02* (2013.01); *G06Q 50/01* (2013.01)
USPC .......................................... 709/229; 705/319

(58) Field of Classification Search
CPC ........................... G06F 17/3053; G06Q 50/01
See application file for complete search history.

(56) References Cited

U.S. PATENT DOCUMENTS

| | | | | |
|---|---|---|---|---|
| 6,429,868 | B1 * | 8/2002 | Dehner et al. ................. | 345/440 |
| 7,310,641 | B2 * | 12/2007 | Moore et al. ........................... | 1/1 |
| 7,467,206 | B2 * | 12/2008 | Moore et al. ................... | 709/225 |
| 7,546,338 | B2 * | 6/2009 | Schran .......................... | 709/203 |
| 7,809,943 | B2 * | 10/2010 | Seidel ........................... | 713/164 |
| 7,822,821 | B2 * | 10/2010 | Foote ............................ | 709/206 |
| 7,860,889 | B1 * | 12/2010 | Martino et al. ................ | 707/784 |
| 7,925,516 | B2 * | 4/2011 | McCann et al. ............... | 705/1.1 |
| 8,010,460 | B2 * | 8/2011 | Work et al. .................... | 705/319 |
| 8,010,511 | B2 * | 8/2011 | Brock et al. ................... | 707/694 |
| 8,554,601 | B1 * | 10/2013 | Marsh et al. ................. | 705/7.32 |
| 2002/0046041 | A1 * | 4/2002 | Lang ................................. | 705/1 |
| 2004/0181517 | A1 * | 9/2004 | Jung et al. .......................... | 707/3 |
| 2005/0052998 | A1 * | 3/2005 | Oliver et al. .................. | 370/231 |
| 2005/0149566 | A1 * | 7/2005 | Baek et al. ................. | 707/104.1 |
| 2005/0159998 | A1 * | 7/2005 | Buyukkokten et al. ......... | 705/11 |
| 2005/0278540 | A1 * | 12/2005 | Cho et al. ...................... | 713/182 |
| 2006/0042483 | A1 * | 3/2006 | Work et al. ..................... | 101/91 |
| 2006/0253584 | A1 * | 11/2006 | Dixon et al. .................. | 709/225 |
| 2007/0073837 | A1 * | 3/2007 | Johnson-McCormick et al. ............................. | 709/217 |
| 2007/0074019 | A1 * | 3/2007 | Seidel .......................... | 713/156 |
| 2007/0094260 | A1 * | 4/2007 | Murphy et al. .................. | 707/9 |
| 2007/0112761 | A1 * | 5/2007 | Xu et al. .......................... | 707/5 |
| 2007/0130351 | A1 | 6/2007 | Alperovitch et al. | |

(Continued)

OTHER PUBLICATIONS

"Web Threats Challenges and Solutions", Retrieved at <<http://itw.trendmicro.com/smart-protection-network/pdfs/wp01_webthreats_080303.pdf>>, Mar. 2008, pp. 19.

(Continued)

*Primary Examiner* — Backhean Tiv
(74) *Attorney, Agent, or Firm* — Bryan Webster; Kate Drakos; Micky Minhas

(57) ABSTRACT

Techniques for reputation mashup are described. Reputation mashup refers to combining, aggregating, collecting, compiling, or otherwise organizing reputation data from multiple sources into a uniform format to facilitate making trust decisions for resources. In an implementation, reputation data for a resource is combined from a plurality of reputation sources. The combined reputation data for the resource is presented to a client to enable a trust determination to be made for the resource. Interaction with the resource by the client is selectively enabled or restricted in accordance with the trust determination made using the combined reputation data.

20 Claims, 6 Drawing Sheets

(56) References Cited

U.S. PATENT DOCUMENTS

| | | | | |
|---|---|---|---|---|
| 2007/0162349 | A1 | 7/2007 | Silver | |
| 2007/0179834 | A1* | 8/2007 | Carter et al. | 705/10 |
| 2007/0214506 | A1 | 9/2007 | Rao et al. | |
| 2007/0218900 | A1* | 9/2007 | Abhyanker | 455/435.1 |
| 2007/0233736 | A1* | 10/2007 | Xiong et al. | 707/104.1 |
| 2007/0294339 | A1* | 12/2007 | Ala-Kleemola et al. | 709/203 |
| 2008/0021958 | A1* | 1/2008 | Foote | 709/204 |
| 2008/0059425 | A1* | 3/2008 | Brock et al. | 707/3 |
| 2008/0071602 | A1* | 3/2008 | Ojakaar et al. | 705/10 |
| 2008/0071912 | A1* | 3/2008 | Moore et al. | 709/227 |
| 2008/0082662 | A1* | 4/2008 | Dandliker et al. | 709/225 |
| 2008/0103969 | A1* | 5/2008 | Flake et al. | 705/39 |
| 2008/0183700 | A1* | 7/2008 | Gabriel et al. | 707/5 |
| 2008/0208616 | A1* | 8/2008 | Young | 705/1 |
| 2008/0288278 | A1 | 11/2008 | Buss | |
| 2009/0055359 | A1* | 2/2009 | Gross | 707/3 |
| 2009/0178125 | A1* | 7/2009 | Barber et al. | 726/6 |
| 2009/0240769 | A1* | 9/2009 | Schran | 709/203 |
| 2010/0115040 | A1* | 5/2010 | Sargent et al. | 709/206 |
| 2010/0205430 | A1* | 8/2010 | Chiou et al. | 713/156 |
| 2010/0223125 | A1* | 9/2010 | Spitkovsky | 705/14.42 |
| 2010/0229221 | A1* | 9/2010 | Tam et al. | 726/4 |
| 2010/0257028 | A1* | 10/2010 | Hillerbrand | 705/10 |
| 2010/0269168 | A1* | 10/2010 | Hegli et al. | 726/11 |
| 2010/0274815 | A1* | 10/2010 | Vanasco | 707/798 |
| 2010/0318614 | A1* | 12/2010 | Sager et al. | 709/206 |
| 2010/0332405 | A1* | 12/2010 | Williams | 705/319 |
| 2011/0004693 | A1* | 1/2011 | Rehfuss | 709/229 |
| 2011/0113098 | A1* | 5/2011 | Walsh et al. | 709/204 |
| 2011/0153551 | A1* | 6/2011 | Gabriel et al. | 707/603 |
| 2011/0219073 | A1* | 9/2011 | Lawler et al. | 709/204 |
| 2012/0265704 | A1* | 10/2012 | Buyukkokten et al. | 705/319 |

OTHER PUBLICATIONS

Engler, et al., "Fundamental Models and Algorithms for a Distributed Reputation System.", Retrieved at <<ftp://ftp.informatik.uni-stuttgart.de/pub/library/ncstrl.ustuttgart_fi/DIS-2008-02/DIS-2008-02.pdf>>, Dec. 17, 2007, pp. 223.

"Oasis Open Reputation Management Systems (ORMS) Technical Committee", Retrieved at <<http://realworldxml.blogspot.com/2008/03/oasis-open-reputation-management.html>>, Mar. 4, 2008, pp. 1-2.

Daly Chris, "Trust Architecture for Future Intelligence Processing", Retrieved at <<issaa.org/documents/NCEStrustframework.doc>>, "A Trust Framework for the DoD Network-Centric Enterprise Services (NCES) Environment", Feb. 20, 2004, pp. 1-69.

Choi, et al., "Trust Models for Community Aware Identity Management", Retrieved at <<http://www.ra.ethz.ch/cdstore/www2006/www.ibiblio.org/hhalpin/irw2006/skruk.pdf>>, WWW2006, May 22-26, 2006, Edinburgh, UK, pp. 10.

* cited by examiner

600

REPUTATION MASHUP

BACKGROUND

The popularity of the Internet is ever increasing. Users may interact with the Internet to obtain various resources (e.g., content and services) and to connect with other people. Because there are many resources and a large number of other people accessible via the Internet, it may be difficult for a user to determine when it is safe to interact with resources and people that the user encounters during online activities.

When a user is unable to determine that a resource or another user is trustworthy, for instance, the user may be uncomfortable and/or may simply choose to forego some interactions. Accordingly, the inability to make informed trust decisions may detract from the user's online experiences and may have a chilling effect on Internet activities and transactions.

SUMMARY

Techniques for reputation mashup are described. Reputation mashup refers to combining, aggregating, collecting, compiling, or otherwise organizing reputation data from multiple sources into a uniform format to facilitate making trust decisions for resources. In an implementation, reputation data for a resource is combined from a plurality of reputation sources. The combined reputation data for the resource is presented to a client to enable a trust determination to be made for the resource. Interaction with the resource by the client is selectively enabled or restricted in accordance with the trust determination made using the combined reputation data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
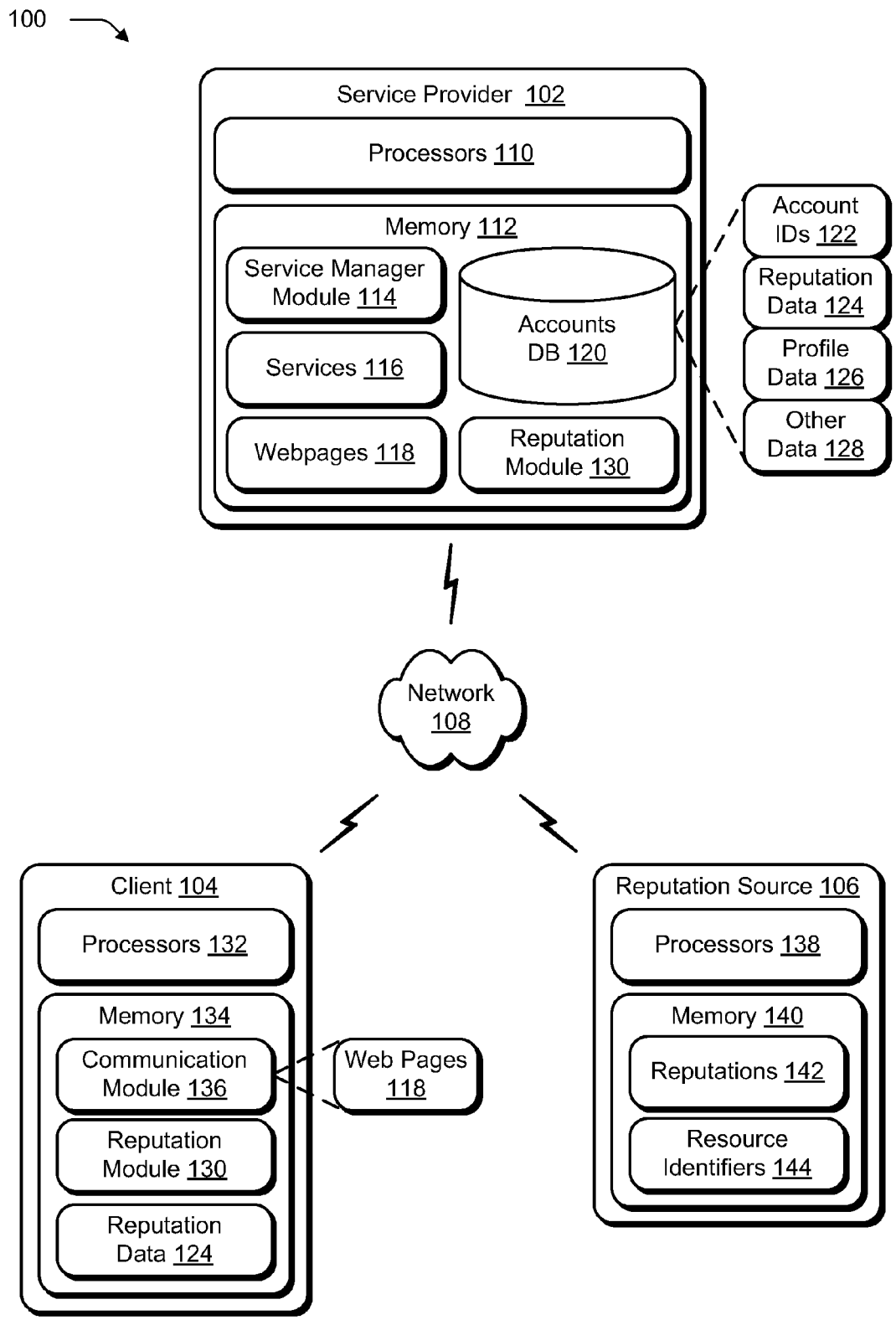
FIG. 1 is an illustration of an environment in an example implementation that is operable to provide reputation mashup.

Users may employ the Internet to interact with various resources (e.g., content and services) and to connect with other people. It may be difficult, however, for users to determine when it is safe to interact with resources and people encountered online. Accordingly, users may feel uneasy about some online interactions, which may detract from users' online experiences.

Techniques for reputation mashup are described. Reputation mashup refers to combining, aggregating, collecting, compiling, or otherwise organizing reputation data from multiple sources into a uniform format to facilitate trust decisions for resources. In an implementation, reputation data for a resource is combined from a plurality of reputation sources. The combined reputation data for the resource is presented to a client to enable a trust determination to be made for the resource. Interaction with the resource by the client is selectively enabled or restricted in accordance with the trust determination made using the combined reputation data.

For example, "Bob" may notice a new bike for sale from an online merchant "MikeBike." "Bob" may have limited knowledge regarding the trustworthiness of "MikeBike." To examine the bike, "Bob" may use a browser to navigate to a website for "MikeBike." When "Bob" does so, a reputation module of Bob's computer may operate to obtain and present reputation data corresponding to "MikeBike" via his browser. The reputation data may include reputation data for "MikeBike" compiled from multiple sources, including endorsements from past buyers, ratings from a merchant rating service, and/or aggregated reputation data supplied to "Bob" as a service through an account of "Bob's" with a service provider. The data from the multiple sources may be combined and presented via the browser in a uniform format that "Bob" has customized to match his preferences. The reputation module may operate to translate and/or map data collected from the multiple sources to "Bob's" customized format.

"Bob" is able to see a wide array of reputation data related to "MikeBike" that he may use to make an informed decision regarding whether to trust "MikeBike." If "Bob" determines to trust "MikeBike," a trust policy of "Bob's" computer may enable a purchase transaction for the bike. On the other hand, if "Bob" does not trust "MikeBike," the trust policy may be configured to restrict the purchase transaction for the bike.

In the discussion that follows, a section entitled "Example Environment" describes an example environment and devices, which may be employed to provide reputation mashup in various embodiments. Following this, a section entitled "Example Procedures" describes example techniques related to reputation mashup in accordance with one or more embodiments. After that, a section entitled "Reputation Mashup Implementation Examples" describes example user interfaces that may be configured to enable reputation mashup. Last, a section entitled "Example Devices" is provided and describes example devices that can be used to implement one or more embodiments.

Example Environment

FIG. 1 is an illustration of an example environment 100 that is operable to provide reputation mashup. Reputation mashup as used herein generally refers to combining, aggregating, collecting, compiling, or otherwise organizing reputation data from multiple sources into a uniform format to facilitate making trust decisions for resources. The illustrated environment includes one or more service providers 102, one or more clients 104, and one or more reputation sources 106, that are communicatively coupled, one to another, over a network

108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. Service provider 102 is depicted as storing a service manager module 114 in the memory 112 that is executable via the one or more processors 110. Service manager module 114 represents functionality operable by service provider 102 to manage various services 116 that may be made available over the network 108. For example, various services 116 may be provided via web pages 118, or other user interfaces, that are communicated over the network for output by the one or more clients 104. Service manager module 114 may manage access to the services 116, performance of the services 116, configuration of web pages 118 to provide the services 116, and so on.

Some examples of services 116 include, but are not limited to, a search service, an e-mail service to send and receive e-mail, an instant messaging service to provide instant messages between clients 104, a social networking service to facilitate connections and interactions between groups of users who share common interests and activities, and a reputation service. The reputation service may assist users in making trust determinations regarding resources (e.g., objects, entities, applications, content, and/or services) encountered in the course of interactions with one or more service providers 102, websites, other users and/or sources of the resources. In at least some embodiments, a reputation service may be configured to compile and provide reputation data from a plurality of reputation sources 106. Additional examples of services 116 include a shopping service, a weblog service, productivity service, authentication service, a news service, and an advertisement service, to name a few.

The authentication service may be provided by the service manager module 114 to authenticate clients to access various services 116 that may be provided by one or more of the service providers 102. For example, a client 104 may provide a username and password that is authenticated by the authentication service. When the authentication is successful, the authentication service may pass a token or use other suitable authentication techniques to enable access to corresponding services 116. Authentication of the client 104 to an account may provide access to a single corresponding service provider 102 and/or service 116. Additionally or alternatively, a single authentication may correspond to many services 116, such that authentication to a single account provides access to many service providers 102 and/or to an entire suite of services 116.

The service manager module 114 may also manage an accounts database 120 that may be configured to store a variety of data related to user accounts with the one or more service providers 102. By way of example and not limitation, an accounts database 120 is depicted as storing account identifiers 122 that may be used for authentication and access control (e.g., unique account IDs, usernames, passwords, and so on), reputation data 124 that may describe reputations for users and resources associated with accounts, and profile data 126 that may correspond to personal data and pages accessible through various services 116. A variety of other data 128 is also contemplated, including service authorizations, user preferences, program files such as documents and spreadsheets maintained online, and other data typically associated with user accounts.

The service provider 102 is also depicted as storing a reputation module 130 in memory 112 that is executable via the one or more processors 110 to implement aspects of reputation mashup techniques described herein. The reputation module 130 may compile reputation data 124 from various sources for communication to clients 104. In an embodiment, functionality represented by the reputation module 130 may be implemented as an application programming interface (API) that may be made accessible to the clients 104 over the network 108. The client 104 may make use of the reputation module 130 via the API to facilitate communication with various reputation sources 106 and collection of reputation data 124 from the reputation sources 106.

The one or more clients 104 are depicted as having one or more processors 132 and memory 134. Memory 134 is depicted as storing another reputation module 130 that may be deployed to the client 104 and is executable via the one or more processors 132 to implement "client-side" aspects and/or other functionality related to reputation mashup techniques described herein. A reputation module 130 of a client 104 may operate in conjunction with reputation related functionality that may be provided by the service provider 102. Additionally or alternatively, a reputation module 130 of a client 104 may be configured to operate independently to obtain reputation data 124 directly from one or more reputation sources 106, which may include the service provider 102 and/or other clients 104. Thus, the depicted reputation modules 130 are representative of functionality operable by a client 104, a service provider 102, and/or a client 104 and service provider 102 in combination. Further discussion regarding the operation and configuration of one or more reputation modules 130 in various embodiments may found in reference to the following figures.

To enable various communications over the network 108, the one or more clients 104 may also include a communication module 136. The communication module 136 is depicted as being stored in memory 134 and is also executable via the processor 132 to provide various interactions with service providers 102 and/or services 116. Examples of such interaction include, but are not limited to, communicating one to another, navigating content, searching web pages, accessing services 116, interacting with a reputation service and/or reputation sources 106, performing searches, instant messaging, e-mail, and so forth. The communication module 136 may be implemented as a browser or other suitable application to obtain and output web pages 118 from the service provider 102 over the network 108. The communication module 136 may also represent a component of another application used to obtain one or more services 116 from the service providers 102. For example, a communication module 136 may be configured as a component of a desktop reputation and trust application of a client 104.

As noted above, reputation data 124 associated with resources may be obtained from third-party sources, such as the one or more reputation sources 106 depicted in the environment 100. The one or more reputation sources 106 are depicted as having one or more processors 138 and memory 140. Memory 140 may store a variety of reputations 142 that may be associated with resources by way of various resource identifiers 144. Reputations 142 may be configured in a variety of ways. Examples of reputations 142 that may be provided by reputation sources 106 include endorsements, trust ratings (e.g., 1 to 10 or "high, medium, low"), comments, a reputation type, threshold values, and other data suitable to describe and/or assert a reputation for corresponding resources. An endorsement as used herein refers to an assertion by one entity, the endorser, regarding another. For example, a user may endorse an online merchant by asserting the merchant is reputable and/or has fair payment policies. In another example, a bank may endorse a user as an agent of the bank. Further, an endorsement from an endorser may be supported with other reputation data regarding the endorser. The other reputation data may be configured to describe trustworthiness of the endorser. Thus, including other reputation data with endorsements enables users to make assessments regarding whether or not to trust various endorsements and/or endorsers.

Reputations 142 may also incorporate supporting data regarding a resource, such as how long the resource has been available, where it is available, how often others interact with the resource, associated trust assertions like digital certificate and/or endorsements, and/or indications as to how often others designate the resource as trusted. It is noted that reputation data 124 collected for a resource may incorporate one or more reputations 142 from one or more reputation sources 106. While FIG. 1 depicts third-party reputation sources 106, a reputation source 106 may also be incorporated with a service provider 102, such as being provided as a service 116 of the service provider 102. A client 104 may also be configured as a reputation source 106 for other clients.

Having considered devices and components of an example environment, consider now example reputation mashup techniques that may be implemented in the environment using the example components, as well as in other environments.

Example Procedures

The following discussion describes techniques for reputation mashup that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
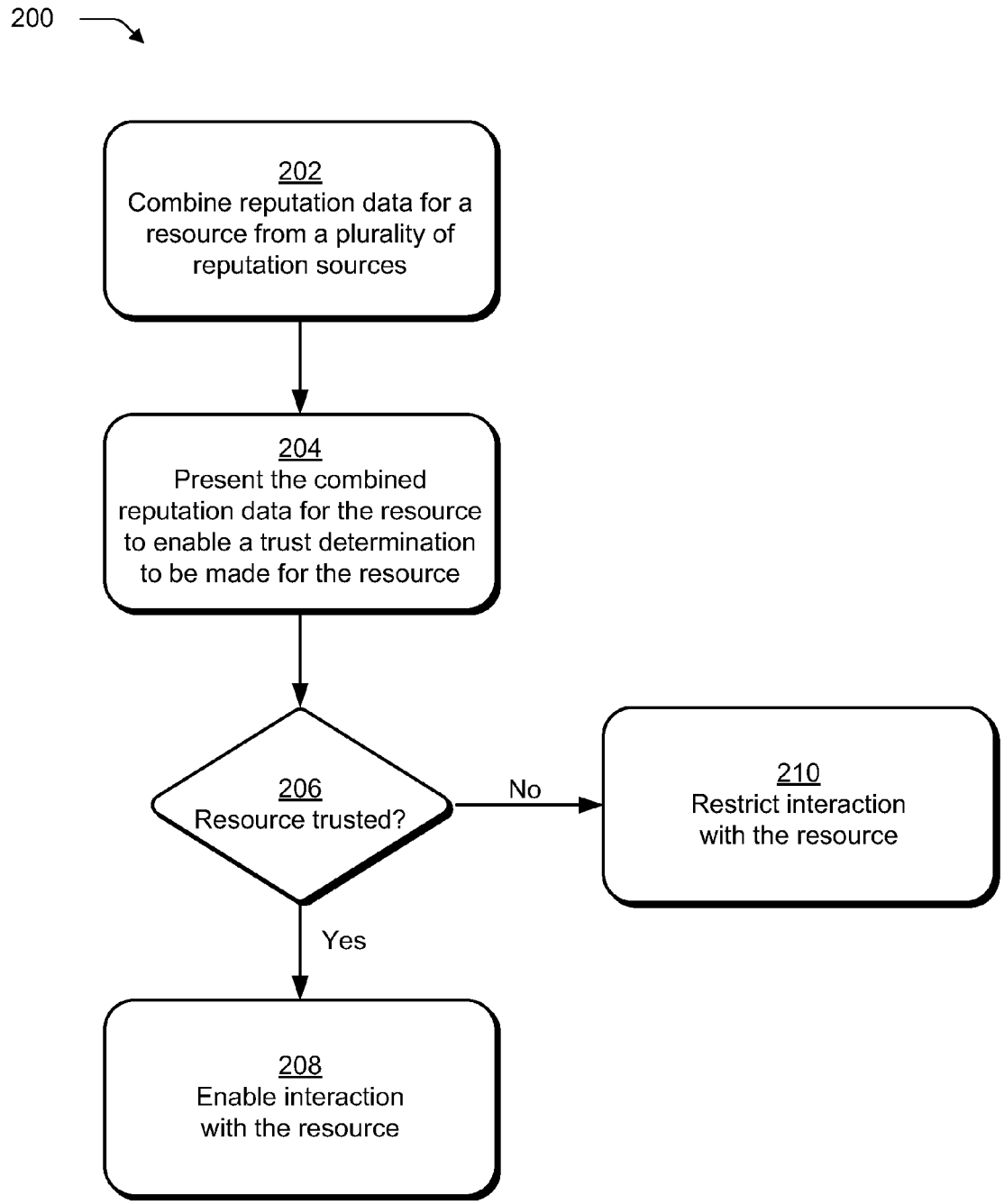
FIG. 2 is a flow diagram depicting a procedure in an example implementation in which a trust determination is made based on combined reputation data.

FIG. 2 depicts a procedure 200 in an example implementation in which a trust determination is made for a resource based on combined reputation data. In at least some embodiments, procedure 200 may be performed by one or more suitably configured modules, such as by one or more reputation modules 130 associated with a client 104 and/or a service provider 102 of FIG. 1.

Reputation data is combined for a resource from a plurality of reputation sources (block 202). For instance, one or more reputation modules 130 depicted in relation to FIG. 1 may be configured in various ways to obtain reputations 142 associated with a resource from a variety of reputation sources 106. Reputations 142 for a resource may be obtained in response to an attempt by a client 104 to interact with the resource. For example, a client 104 may navigate to a website that provides shareware applications and select a shareware football game for downloading. The client 104 may access the football game (e.g., the resource) using a communication module 136 to interact through the service provider 102 and/or by directly navigating to a website or uniform resource locator (URL) associated with the game. Before proceeding with the download, reputation module 130 may operate to obtain and present reputation data 124 associated with the football game to enable a determination of trust to be made for the game and/or for a provider of the game.

In particular, a reputation module 130 may be configured to detect when interaction occurs with resources, such as detecting interaction of the client 104 with the shareware website and/or the selected game. In response to detecting the interaction, the reputation module 130 may identify the corresponding resource. For example, the reputation module 130 may determine one or more resource identifiers 144 associated with the website and/or football game, such as the website URL, a hash sufficient to identify the football game, an account identifier 122 corresponding to the website or game, or other data suitable to identify the resource. The reputation module 130 may then conduct a search for reputations 142 related to the website and/or game. Additionally or alternatively, reputation module 130 may generate one or more requests for communication to the service provider 102 and/or reputation sources 106 to obtain corresponding reputation data 124. The reputation module 130 may make use of resource identifiers 144 to perform the searches and/or requests for reputation data 124. For instance, the resource identifiers 144 may be employed to discover data records that match the resource identifier 144 or are otherwise associated with corresponding resources.

Moreover, the client 104 may obtain reputation related data for the game directly and/or with aid from the service provider 102. For example, client 104 may communicate directly with one or more reputation sources 106 to obtain reputations 142. In this example, the clients may form requests to reputation sources 106 using resource identifiers 144 and receive corresponding reputations 142 in return. Reputations 142 may represent uncombined pieces of reputation related data that may be combined to produce reputation data 124 for a resource.

In another example, client 104 may interact with service provider 102 to obtain reputation data 124 by way of a service 116 provided by the service provider 102. Here, the reputation data 124 may represent a "mashup" of data that combines reputations 142 from multiple sources. In this manner, the client 104 is able to leverage reputation data 124 that may have been previously compiled and stored by the service provider 102 instead of having to individually query each of the reputation sources 106. Further discussion of a service provider 102 configured to compile reputation data 124 on behalf of clients 104 may be found in relation to FIG. 4 below.

A reputation module 130 may be further configured to combine reputations 142 from various sources to facilitate making a trust decision regarding the resource at the client 104. This may include translating reputations 142 from the various sources into a uniform format that is supported by the reputation module 130. The uniform format may include a variety of data fields to facilitate combining data from multiple sources. The reputation module 130 may be configured in a variety of ways to map data from various sources of reputation data to fields of the uniform format. Examples of data fields suitable to implement a uniform format may be found in relation to the example user interface of FIG. 5 below.

In at least some embodiments, each reputation record for a resource may be categorized according to a reputation type. Reputation types may be defined to categorize reputation records in a variety of ways. For instance, reputation types may include different types for service-based reputations, ratings, endorsements, reputations from friends, reputations from trusted parties, reputations from un-trusted parties, and so forth.

Reputation values may also be normalized to a common scale selected for the uniform format. For instance, each reputation value may be converted to a scale of 1 to 10 that indicates a relative level of trust for a corresponding resource. In addition, data supporting a reputation may be used to populate a comment field of the uniform format. In this way, raw data underlying each reputation record may be made available along with combined reputation data 124 presented at a client 104.

Note that different clients 104 may configure customized mappings and/or formats to create "client-specific" uniform formats for combining and presenting reputation data. For instance, clients 104 may be able to select different normalized scales and define custom reputation types. Further discussion of translating reputation related data into a uniform format may be found in relation to the example user interface of FIG. 5 below.

In the above example of a shareware football game, multiple pieces of reputation data related to the football game may be combined by the reputation module 130. By way of example, the pieces of reputation information collected for the game may include a rating from a game review site, endorsements from several gamers, feedback from users regarding the shareware website, and a reputation value and/or related data obtained from a reputation source 106.

Combining reputation data 124 from multiple sources enables presentation of a complete picture of available reputation data to a client 104. Such presentations may include reputations 142 and underlying data that are organized by the reputation module 130 into a uniform format as described above and below. Thus, reputation data 124 for resources may be presented in a consistent and readily understandable format. A trust decision based on the reputation data 124 may be made at the client 104 using reputation data 124 that is obtained directly by the client 104 and/or with aid of the service provider 102.

In particular, when combined reputation data for a resource is available, the combined reputation data is presented for the resource to enable a trust determination to be made for the resource (block 204). In the above example, the reputation module 130 may configure a webpage 118 for output at the client 104 that includes the various pieces of reputation information collected for the football game. As noted, the data may be formatted in accordance with a uniform format.

For instance, the data may be presented within a table having various data fields of the uniform format as column headers and a row corresponding to each source of reputation information. In another example, a scrollable list may be presented having individual portions that correspond to each source and incorporate associated reputation data 124. A variety of other examples are also contemplated. The webpage 118 may also be configured to include summary data, such as listing of a total number of reputation sources, an overall reputation rating, and/or a number of favorable ratings to name a few examples.

Based on the presentation of combined reputation data, a determination is made regarding whether the resource is trusted (block 206). One way this may occur is by enabling a selection to designate trust for a resource via a webpage 118 that presents the combined reputation data. For instance, the webpage 118 configured for the football game in the above example may include a link operable to configure a trust policy for the football game. Selection of the link may enable designating a trust level for the game and/or configuring settings of the trust policy to control access of the game to computing resources. For example, the trust policy may be configurable to control access of the game and other resources to an operating system, interfaces, applications, processors 132, memory 134, and/or other suitable computing resources associated with the client 104. A variety of other techniques and selectable controls to enable a designation of trust are contemplated further discussion of which may be found in relation to the following figures.

When the resource is trusted, interaction is enabled with the resource (block 208). When the resource is not trusted, interaction with the resource is restricted (block 210). In the continuing example, when it is determined that the shareware football game is trusted, downloading of the game may proceed. On the other hand, downloading of the game may be prevented when the football game is not trusted. Further discussion of selectively enabling or restricting interaction with resources based on a determination of trust may also be found in relation to the following figures.

Figure 3:
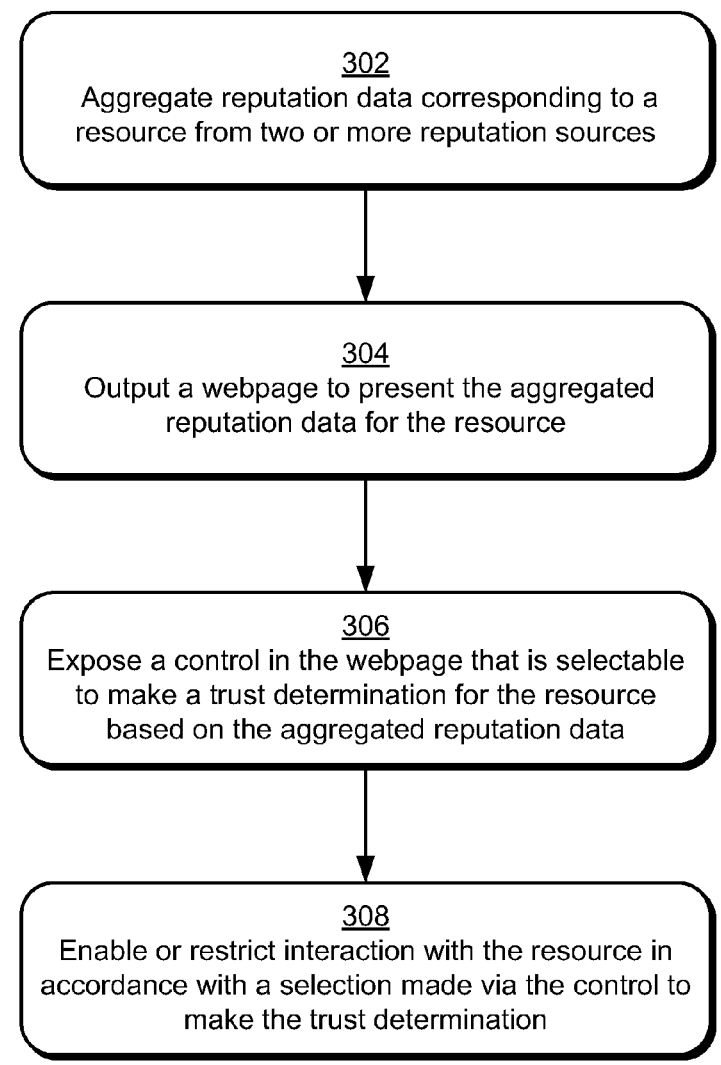
FIG. 3 is a flow diagram depicting a procedure in an example implementation in which a client causes reputation data.

FIG. 3 depicts a procedure 300 in an example implementation in which a client implements aspects of techniques for reputation mashup. In at least some embodiments, procedure 300 may be performed by a suitably configured client, such as a client 104 of FIG. 1 having a reputation module 130.

Reputation data that corresponds to a resource is aggregated from two or more reputation sources (block 302). For example, a reputation module 130 deployed to a client 104 may operate to aggregate reputation data 124 for a resource through interaction with two or more reputation sources 106. Consider a user "Steve" who may take advantage of a social networking service and/or other services 116 provided by the service provider 102. In the course of interacting with the social networking service, "Steve" may be invited to become friends with another user "Kyle," e.g., invited to add "Kyle" to his social network. Before doing so, reputation mashup techniques described herein may be employed to enable "Steve" to examine reputation data 124 regarding "Kyle" and determine if he should trust "Kyle."

In general, aggregation of reputation data may occur responsive to interaction of a client 104 with one or more services 116 from a service provider 102 to facilitate trust determinations for resources associated with the services 116. In an embodiment, a reputation module 130 may operate to aggregate reputation data automatically based upon interaction of a client 104. In the preceding example, reputation module 130 may operate to aggregate reputation data 124 corresponding to "Kyle" automatically based upon interaction of "Steve" with the invitation. Additionally or alternatively, aggregation may occur responsive to a user selection to cause the aggregation. For instance, "Steve" may make a selection via a webpage 118 that presents the invitation to cause aggregation of reputation data 124 related to "Kyle" by the reputation module 130. In each case, an account identifier 122 of an account of "Kyle's" with the service provider 102 may be employed to discover reputation records related to "Kyle" from the service provider 102 and/or from reputation sources 106. The reputation records related to "Kyle" may be combined and modified to adhere to a uniform format as described herein.

Figure 5:
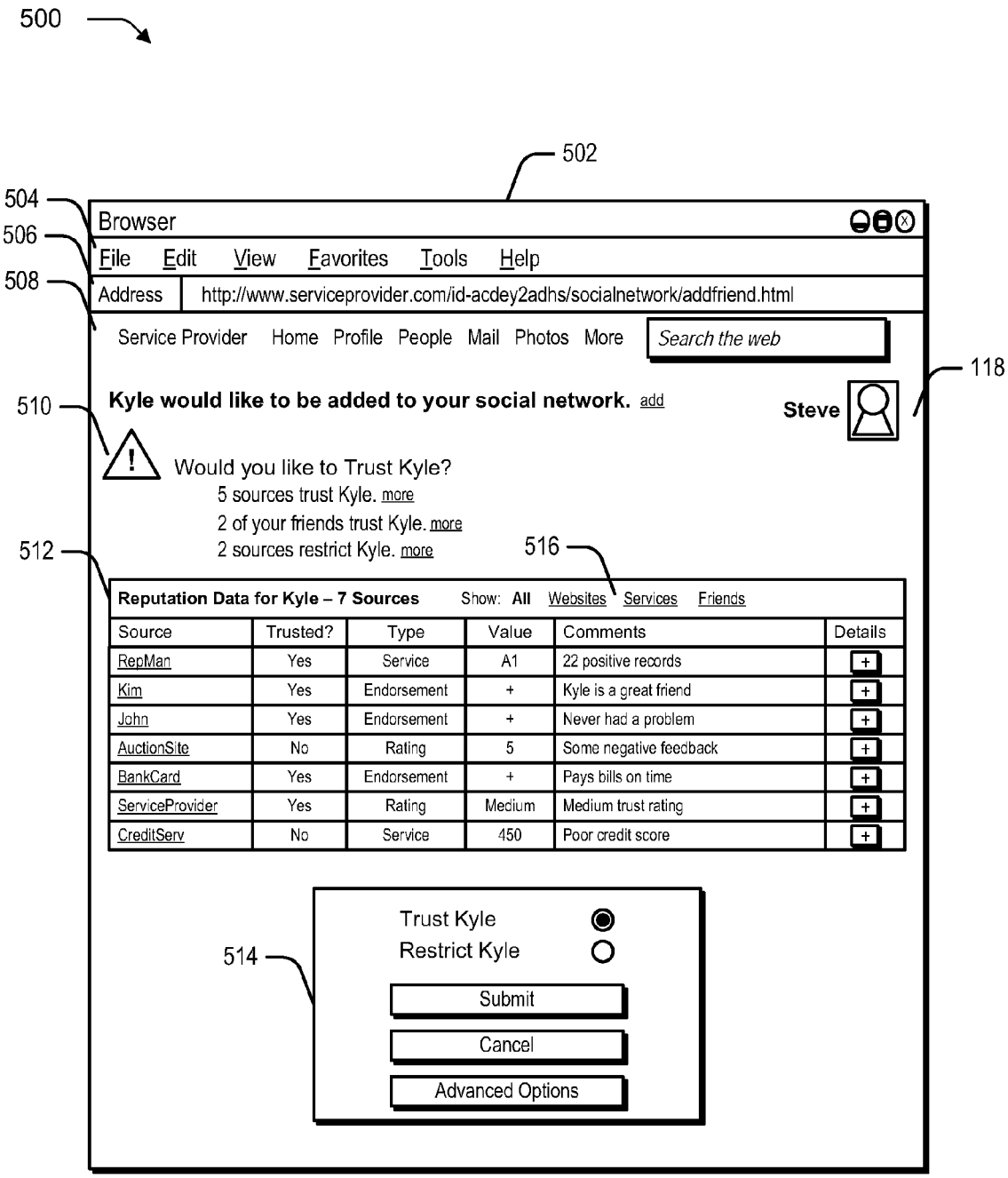
FIG. 5 is an illustration of an example web page configured to enable aspects of reputation mashup in accordance with one or more embodiments.

In some examples, a webpage is output to present the aggregated reputation data for the resource (block 304). Further, a control is exposed in the webpage that is selectable to designate trust for the resource based on the aggregated reputation data (block 306). In the foregoing example, the reputation module 130 may operate to cause a communication module 136 of the client 104 to output a webpage 118 that includes aggregated reputation data related to "Kyle." The webpage 118 may expose a link, button, list box, menu item, icon, or other suitable control that is selectable by "Steve" to designate trust for "Kyle." Accordingly, via the webpage 118, "Steve" is able to examine reputation data aggregated from various sources regarding "Kyle" and may utilize the control to designate trust for "Kyle" based on the aggregated reputation data. An example webpage is depicted in FIG. 5 and described in detail below in a section entitled "Reputation Mashup Implementation Examples."

Interaction with the resource is enabled or restricted in accordance with a selection made via the control to designate trust for the resource (block 308). In the continuing example, "Steve" may utilize the webpage to designate "Kyle" as "trusted" or "untrusted," or to designate trust as "low," "medium," or "high." Alternatively, "Steve" may associate a trust level with "Kyle" according to a numeric scale, such as from 1 to 10. Subsequent interaction of the client 104 with "Kyle" may be based upon the designated trust that "Steve" associated with "Kyle." For instance, establishing of a friend relationship between "Steve" and "Kyle" may be permitted for "medium" or "high" trust and prevented for "low" trust.

In an embodiment, a trust policy may be configured and applied to control how resources are permitted to interact with the client 104. The trust policy may be configured to enable or disable various interactions with the client 104 at various levels of trust. Reputation mashup techniques may be employed to facilitate designation of trust for various resources. Accordingly, designation of trust for a resource may involve configuring the trust policy to define trust for the resource. Moreover, the trust policy may include a global policy that is applied to each resource and/or resource specific policies that are configured and applied separately for particular resources or group of resources.

Figure 4:
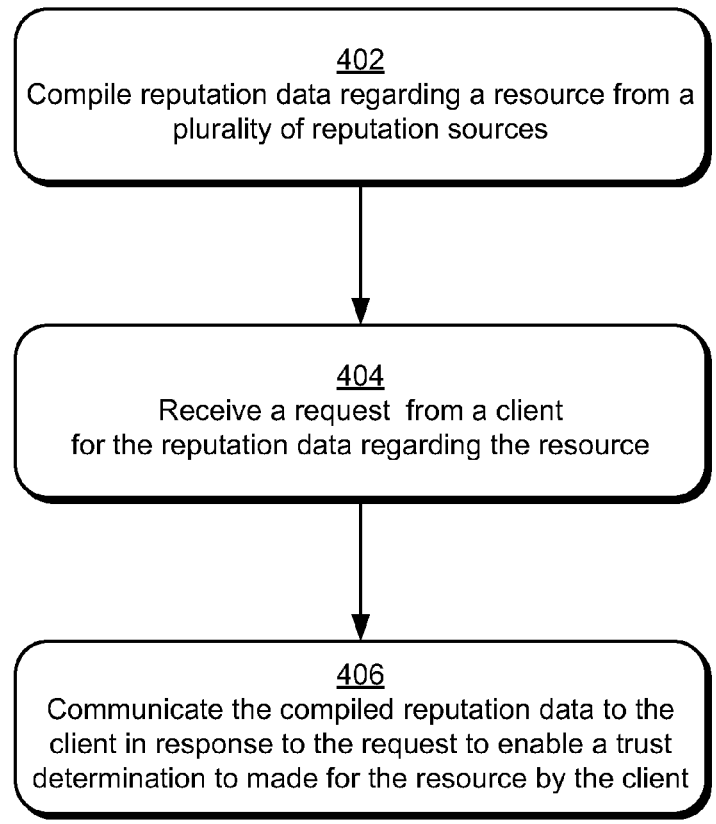
FIG. 4 is a flow diagram depicting a procedure in an example implementation in which a service provider provides reputation data to clients as a service.

FIG. 4 depicts a procedure 400 in an example implementation in which a service provider implements aspects of techniques for reputation mashup. In at least some embodiments, procedure 400 may be performed by a suitably configured service provider, such as a service provider 102 of FIG. 1 having a reputation module 130.

Reputation data regarding a resource is compiled from a plurality of reputation sources (block 402). For instance, a service provider 102 of FIG. 1 may compile reputation data 124 on behalf of clients 104. The service provider 102 may provide the compiled data as a service 116 over the network 108 to the clients 104. The service provider 102 may collect reputations 142 and relate data from a plurality of reputation sources 106 and store reputation data 124 in memory 112 as reputation data 124. Reputation data 124 may be stored automatically (e.g., in advance of client requests) so that the data is already available when requests for the data are made by clients 104. The service provider 102 may also collect data for a particular resource responsive to a request from a client 104.

In at least some embodiments, the service provider 102 may store data in association with accounts for the resources. For example, in a social networking setting, user accounts with the service provider 102 may be populated with reputation data 124 that may provided when users seek to establish friend relationships one to another. Accounts with the service provider 102 may also be associated with business entities, websites, content providers and/or other resources that clients 104 may attempt to access. Accordingly, corresponding reputation data 124 may be stored with these accounts and provided by way of the accounts.

A request is received from a client for the reputation data regarding the resource (block 404). For instance, requests may be generated by clients 104 when encountering resources during interaction with other clients 104, websites, web providers, and/or associated content and services. The requests may be received and processed at the service provider 102 to obtain associated reputation data 124.

The compiled reputation data is communicated to the client in response to the request to enable a trust determination to be made for the resource by the client (block 406). In at least some embodiments, a service provider 102 may make use of reputation module 130 to organize reputation data for a resource from multiple reputation sources into a uniform format and store the data for access by the clients 104. Additionally or alternatively, the service provider 102 may communicate data in a raw format to the clients to enable transformation of the raw data into a uniform format by the clients 104.

Having considered example procedures related to reputation mashup, consider now example implementations of user interfaces that may be employed to provide techniques for reputation mashup in one or more embodiments.

Reputation Mashup Implementation Examples

FIG. 5 depicts an implementation 500 showing an example webpage 118 that is operable to present reputation data for a resource. The webpage 118 in this instance is illustrated as incorporated within a user interface 502 that may be provided by the communication module 136. For example, the communication module 136 may be configured as a browser operable to expose the user interface 502 to enable interaction with one or more service providers 102 and corresponding services 116. To provide the interaction with services 116, the user interface 502 includes a menu bar 504, an address bar 506, and a navigation bar 508. The menu bar 504 is a portion of the user interface 502 that includes drop-down menus of commands, examples of which are illustrated as "file", "edit", "favorites", "tools" and "help". The address bar 506 is configured to receive inputs to navigate to particular network addresses and/or display current network addresses, from which, the client 104 has received content that is being displayed. The navigation bar 508 may be operable to navigate to interact with a service provider 102 in various ways including selecting various services 116, searches for web pages 118, obtaining different web pages 118 corresponding to services 116, interacting with service provider 102 and/or reputation sources 106 to obtain reputation related data, and so forth.

In the example of FIG. 5, the webpage 118 within the user interface 502 is configured as a page for an authenticated user "Steve" that may be exposed via a social networking service or other service 116. Although depicted as being part of the user interface 502 of a browser, a user interface comparable to the webpage 118 may also be provided by standalone applications of the client 104, such as a desktop social networking application. In each case, the webpage 118 may make use of a reputation module 130 to enable reputation mashup techniques discussed herein.

In particular, the example webpage 118 in FIG. 5 is illustrated as a page that may be output to "Steve" when he is invited to become a friend of "Kyle," as in the example discussed in relation to FIG. 3. The webpage includes a notification portion 510 to alert "Steve" to consider whether to trust "Kyle", a reputation portion 512 to present details regarding "Kyle's" reputation, and a control portion 514 that is selectable to designate trust for "Kyle". The notification portion 510 also includes summary data for presentation to "Steve" indicating that "5 sources trust Kyle", "2 of your friends trust Kyle", and that "2 sources restrict Kyle." Each of these items appears with a "more" link that is selectable to obtain additional information regarding the corresponding item.

The reputation portion 512 is configured to present combined reputation data that may be collected from multiple reputation sources 106 in accordance with reputation mashup techniques described herein. In particular, the reputation portion 512 shows reputation data 124 for "Kyle" combined from seven sources. The example reputation portion is arranged as a table that includes a row for each source. The table includes a plurality of columns that may represent fields of a uniform format employed to present the reputation data 124. In particular, individual columns are included to present data in fields describing each of a source of a reputation, whether the source trusts "Kyle", a reputation type, reputation values, comments, and a details control operable to obtain more details for a selected source. While a table is depicted, reputation portion 512 may be configured in a variety of ways to present reputation data for a resource. By way of example and not limitation, a reputation portion 512 may be configured as a list, a set of icons, a series of boxes each corresponding to a reputation source 106, a scrollable dashboard, and so forth.

Note that the data for the different sources in the example reputation portion 512 is illustrated as being arranged in accordance with a uniform format as discussed herein. For example, a "Trusted?" column reflects normalization of values that are presented in a "Values" to a common scale. Further, the "Type" column reflects categorization of the reputations from the seven sources according to reputation types. A filter portion 516 also appears that is operable to filter the list of reputation data in accordance with the reputation types or other suitable categories. Further, underlying data for the reputations from the sources has been mapped to the "Value" and "Comment" fields.

The control portion 514 may be configured in a variety of ways to enable a designation of trust for a corresponding resource. In the illustrated example, the control portion 514 appears as a radio control box having options to "Trust Kyle" and "Restrict Kyle." In particular, by selection of an option from the radio control box and clicking on a "Submit" button, "Steve" may cause a trust designation for "Kyle" to be input and stored. This may include updating of a trust policy of a client 104 to reflect a trust status for "Kyle." Further, "Steve" may select the "Advanced Options" button to interact with additional configuration options for the trust policy. For instance, various advanced options may enable "Steve" to control what content and/or computing resources "Kyle" is able to access. The control portion 514 may also include a "Cancel" portion selectable to cancel out of the trust designation for "Kyle."

Example Device

Figure 6:
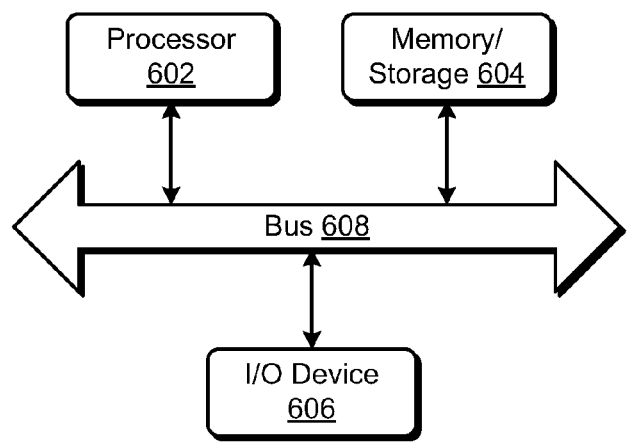
FIG. 6 is an illustration of an example device in accordance with one or more embodiments.

FIG. 6 illustrates an example computing device 600 that may implement the various embodiments described above. The computing device 600 may be, for example, a client 104 of FIG. 1, a server of a service provider 102, a server of a reputation source 106, or any other suitable computing device.

The computing device 600 includes one or more processors or processing units 602, one or more memory and/or storage components 604, one or more input/output (I/O) devices 606, and a bus 608 that allows the various components and devices to communicate one to another. The bus 608 represents one or more of several types of bus structures, including a memory bus or memory controller, a peripheral bus, an accelerated graphics port, and a processor or local bus using any of a variety of bus architectures. The bus 608 can include wired and/or wireless buses.

The memory/storage component 604 represents one or more computer storage media. The memory/storage component 604 may include volatile media (such as random access memory (RAM)) and/or nonvolatile media (such as read only memory (ROM), Flash memory, optical disks, magnetic disks, and so forth). The memory/storage component 604 may include fixed media (e.g., RAM, ROM, a fixed hard drive, etc.) as well as removable media (e.g., a Flash memory drive, a removable hard drive, an optical disk, and so forth).

The one or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may comprise "computer-readable storage media."

Software or program modules, including the reputation module 130, communication module 136, service manager module 114, and other program modules, may be embodied as one or more instructions stored on computer-readable storage media. The computing device 600 may be configured to implement particular functions corresponding to the software or program modules stored on computer-readable storage media. Such instructions may be executable by one or more articles of manufacture (for example, one or more computing device 600, and/or processors 602) to implement techniques for reputation mashup, as well as other techniques. Such techniques include, but are not limited to, the example procedures described herein. Thus, computer-readable storage media may be configured to store instructions that, when executed by one or more devices described herein, cause various techniques for reputation mashup.

The computer-readable storage media includes volatile and non-volatile, removable and non-removable media implemented in a method or technology suitable for storage of information such as computer readable instructions, data structures, program modules, or other data. The computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

Conclusion

Although the reputation mashup techniques have been described in language specific to structural features and/or methodological acts, it is to be understood that the appended claims are not necessarily limited to the specific features or acts described. Rather, the specific features and acts are disclosed as example forms of implementing the reputation mashup techniques.

What is claimed is:

1. A method implemented by a computer, the method comprising:
combining reputation data corresponding to a resource from a plurality of different third-party reputation sources, the combining involving translating the reputation data from the plurality of different third-party reputation sources into a uniform reputation data format having data fields to maintain values of the reputation data from the plurality of different third-party reputation sources and a normalized data field to maintain a normalized value that represents at least one of the values maintained in the data fields;

presenting the combined reputation data for the resource to enable a trust determination to be made for the resource;

determining whether the resource is trusted or un-trusted;

enabling interaction with the resource when the resource is trusted; and restricting interaction with the resource when the resource is un-trusted.

2. A method as described in claim 1, wherein the combining, presenting, and determining are performed by the computer that is configured as a client device to access the resource over a network from a service provider.

3. A method as described in claim 1, wherein the combining and presenting are performed by the computer that is operated as a part of a service provider that is configured to provide a plurality of services to clients over a network to enable the determining by the clients.

4. A method as described in claim 1, wherein translating the reputation data into the uniform reputation data format includes mapping reputation data formats of the plurality of different third party reputation sources to data fields of the uniform reputation data format.

5. A method as described in claim 1, wherein:
the combining includes assigning reputation types to the plurality of different third-party reputation sources; and
the presenting includes presenting the reputation data in association with the reputation types.

6. A method as described in claim 5, further comprising enabling filtering of the presented reputation data based on the reputation types.

7. A method as described in claim 1, wherein the combining comprises normalizing the values that are indicative of reputation from the plurality of different third-party reputation sources to values on a common scale.

8. A method as described in claim 1, wherein the presenting comprises outputting a webpage having the combined reputation data at a client in conjunction with one or more services available to the client from a service provider.

9. A method as described in claim 1, wherein the reputation data includes an endorsement of the resource by an entity and the endorsement includes other reputation data that describes trustworthiness of the entity making the endorsement.

10. A method as described in claim 1, wherein the resource, for which the reputation data is combined from the plurality of different third-party reputation sources, corresponds to a user of a social networking service and the reputation data is indicative of trustworthiness of the user.

11. A method as described in claim 1, wherein the resource corresponds to a website.

12. A method as described in claim 1, wherein the resource, for which the reputation data is combined from the plurality of different third-party reputation sources, corresponds to at least one of an application available for download by a client via the network or a provider from which the application is available for download.

13. One or more computer-readable storage memory devices comprising instructions that, when executed by a client device, cause the client device to perform operations comprising:
aggregating reputation data corresponding to a resource from two or more third-party reputation sources into a uniform data format, the reputation data from each of the two or more third-party reputation sources indicating a trustworthiness of the resource and incorporating supporting data regarding the resource, the uniform data format having data fields to which the reputation data is mapped from different reputation data formats of the two or more third-party reputation sources and a normalized data field that reflects normalization of at least one reputation data value mapped to the data fields;

outputting a webpage that is configured to present the aggregated reputation data for the resource from both the normalized data field and the data fields to which the reputation data is mapped;

exposing a control in the webpage that is selectable to designate trust for the resource based on the aggregated reputation data; and selectively enabling interaction of the client with the resource in accordance with a selection made via the control to make the trust designation.

14. One or more computer-readable storage memory devices as described in claim 13, wherein the operations further comprise categorizing the reputation data from the two or more third-party reputation sources according to reputation types.

15. One or more computer-readable storage memory devices as described in claim 13, wherein the operations further comprise normalizing the values that are indicative of trust from the two or more third-party reputation sources to values on a common scale of trust.

16. One or more computer-readable storage memory devices as described in claim 13, wherein aggregating the reputation data comprises:
generating requests for communication to the two of more third-party reputation sources to obtain the reputation data, the requests including data sufficient to identify the resource;
obtaining the reputation data responsive to communication of the requests;
translating the obtained reputation data into the uniform data format;
normalizing the values that are indicative of trust from the obtained reputation data to values on a common scale of trust; and
categorizing the obtained reputation data according to reputation types.

17. A system to provide a reputation service comprising:
one or more processors;
one or more computer-readable storage media storing instructions that, when executed via the one or more processors, cause the one or more processors to perform operations comprising:
compiling reputation data regarding a resource from a plurality of third-party reputation sources, at least some of the reputation data regarding the resource being uncombined but related prior to the compiling and being combined to form the at least some reputation data responsive to the compiling, the compiled reputation data being formatted according to a uniform reputation data format having data fields to which the reputation data from different data formats is mapped and a normalized data field to maintain a normalized value of mapped reputation data from at least one of the data fields;
receiving a request from a client for the reputation data regarding the resource; and
communicating the compiled reputation data to the client in response to the request to enable a trust determination to be made for the resource by the client.

18. A system as described in claim 17, wherein the operations further comprise configuring a webpage to include the compiled reputation data for communication to the client in response to the request.

19. A system as described in claim 17, wherein the one or more processors are implemented via one or more server devices of a service provider, the service provider configured to provide a plurality of services over the network to the client including the reputation service.

20. A system as described in claim 17, wherein the plurality of third-party reputation sources includes a provider of reputation data.

\* \* \* \* \*